(12) United States Patent
Hwang et al.

(10) Patent No.: US 9,591,591 B2
(45) Date of Patent: Mar. 7, 2017

(54) INTERFERENCE-REMOVED RECEPTION METHOD AND TERMINAL

(71) Applicant: LG ELECTRONICS INC., Seoul (KR)

(72) Inventors: Jinyup Hwang, Seoul (KR); Sangwook Lee, Seoul (KR); Manyoung Jung, Seoul (KR); Yoonoh Yang, Seoul (KR); Suhwan Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/760,843

(22) PCT Filed: Jan. 10, 2014

(86) PCT No.: PCT/KR2014/000290
§ 371 (c)(1),
(2) Date: Jul. 14, 2015

(87) PCT Pub. No.: WO2014/112749
PCT Pub. Date: Jul. 24, 2014

(65) Prior Publication Data
US 2016/0029321 A1 Jan. 28, 2016

Related U.S. Application Data

(60) Provisional application No. 61/753,948, filed on Jan. 18, 2013.

(51) Int. Cl.
*H04W 52/24* (2009.01)
*H04W 36/00* (2009.01)
(Continued)

(52) U.S. Cl.
CPC ........ *H04W 52/244* (2013.01); *H04B 17/345* (2015.01); *H04J 11/005* (2013.01);
(Continued)

(58) Field of Classification Search
CPC ........... H04J 11/0023; H04W 72/1289; H04W 88/06; H04W 152/001; H04W 152/005;
(Continued)

(56) References Cited

U.S. PATENT DOCUMENTS

2010/0110901 A1* 5/2010 Wong .................... G06F 11/076
370/242
2011/0151918 A1* 6/2011 Seo ........................ H04B 7/024
455/522

(Continued)

FOREIGN PATENT DOCUMENTS

KR 10-2010-0065075 A 6/2010
KR 10-2012-0056274 A 6/2012
(Continued)

*Primary Examiner* — Nizar Sivji
(74) *Attorney, Agent, or Firm* — Dentons US LLP

(57) ABSTRACT

One embodiment of the present specification provides an interference-removed reception method. The interference-removed reception method may comprise the steps of: receiving, from a serving cell, interference removal support information comprising transmission power information on the any channel of a neighboring cell; estimating the channel of the serving cell; receiving data by decoding the channel of the serving cell; and removing interference by the any channel of the neighboring cell, which is comprised in the received data, by using the transmission power in the received interference removal support information.

8 Claims, 19 Drawing Sheets

(51) Int. Cl.
*H04J 11/00* (2006.01)
*H04B 17/345* (2015.01)
*H04W 52/38* (2009.01)
*H04L 5/00* (2006.01)

(52) U.S. Cl.
CPC ....... H04L 5/0073 (2013.01); H04W 36/0083 (2013.01); H04W 52/38 (2013.01); *H04L 5/001* (2013.01); *H04L 5/005* (2013.01); *H04L 5/0051* (2013.01)

(58) Field of Classification Search
CPC ........ H04W 152/0051; H04W 36/0083; H04L 1/1896; H04L 2001/0097; H04L 1/0025; H04B 7/024; H04B 7/0671; H04B 7/0426; H04B 7/0639
See application file for complete search history.

(56) References Cited

U.S. PATENT DOCUMENTS

2011/0312358 A1* 12/2011 Barbieri ................ H04W 24/10
455/507
2012/0281683 A1* 11/2012 Falconetti ............ H04J 11/0023
370/336

FOREIGN PATENT DOCUMENTS

| KR | 10-2012-0086279 A | 8/2012 | |
|---|---|---|---|
| KR | 10-2012-0112567 A | 10/2012 | |
| WO | WO 2012064589 A1 * | 5/2012 | ........... H04L 1/0026 |

* cited by examiner

ID RECEPTION
INTERFERENCE-REMOVED RECEPTION METHOD AND TERMINAL

This application is a 35 USC §371 National Stage entry of International Application No. PCT/KR2014/000290 filed on Jan. 10, 2014, and claims priority to U.S. Provisional Application No. 61/753,948 filed on Jan. 18, 2013, both of which are hereby incorporated by reference in their entireties as if fully set forth herein.

BACKGROUND OF THE INVENTION

Field of the Invention

A disclosure of the present specification relates to an interference-removed reception method and a terminal.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

In recent years, there is an ongoing discussion on 3GPP LTE-advanced (LTE-A) evolved from the 3GPP LTE.

In addition, in recent years, there is an ongoing discussion on a heterogeneous network in which a macro cell and a small cell co-exist. In particular, there is an ongoing discussion for traffic offloading by distributing terminals connected to the macro cell to the small cell.

Meanwhile, interference may be more and more increased due to such a small cell, and thus an interference cancellation capability is desperately required.

SUMMARY OF THE INVENTION

Accordingly, a disclosure of the present specification aims to provide an effective interference cancellation method and a terminal using the method.

In order to achieve the aforementioned purpose, one disclosure of the present invention provides an interference-cancelled reception method. The method may comprise: receiving, from a serving cell, interference cancellation assistance information including transmission power information on an any channel of a neighbor cell; estimating a channel of the serving cell; receiving data by decoding the channel of the serving cell; and cancelling interference caused by the any channel of the neighbor cell and included in the received data by using transmission power in the received interference cancellation assistance information.

The transmission power information may be acquired by the serving cell from the neighbor cell.

The interference cancellation assistance information may be received through a radio resource control (RRC) signal.

In estimating the channel, the any channel of the neighbor cell may be also estimated.

The method may further comprise: decoding and re-generating data on the any channel of the neighbor cell.

The transmission power information regarding the any channel may include a parameter which is specific to a terminal in a neighbor cell and a parameter which is specific to the neighbor cell.

In order to achieve the aforementioned purpose, one disclosure of the present invention provides an interference-cancelled reception terminal. The terminal may comprise: a radio frequency (RF) unit; and a processor for controlling the RF unit. The processor receives, from a serving cell, interference cancellation assistance information including transmission power information on an any channel of a neighbor cell, estimates a channel of the serving cell and thereafter receives data by decoding the channel of the serving cell, and cancels interference caused by the any channel of the neighbor cell and included in the received data by using transmission power in the received interference cancellation assistance information.

According to a disclosure of the present specification, a reception capability can be more increased through an interference cancellation capability.

DESCRIPTION OF EXEMPLARY EMBODIMENTS

Figure 1:
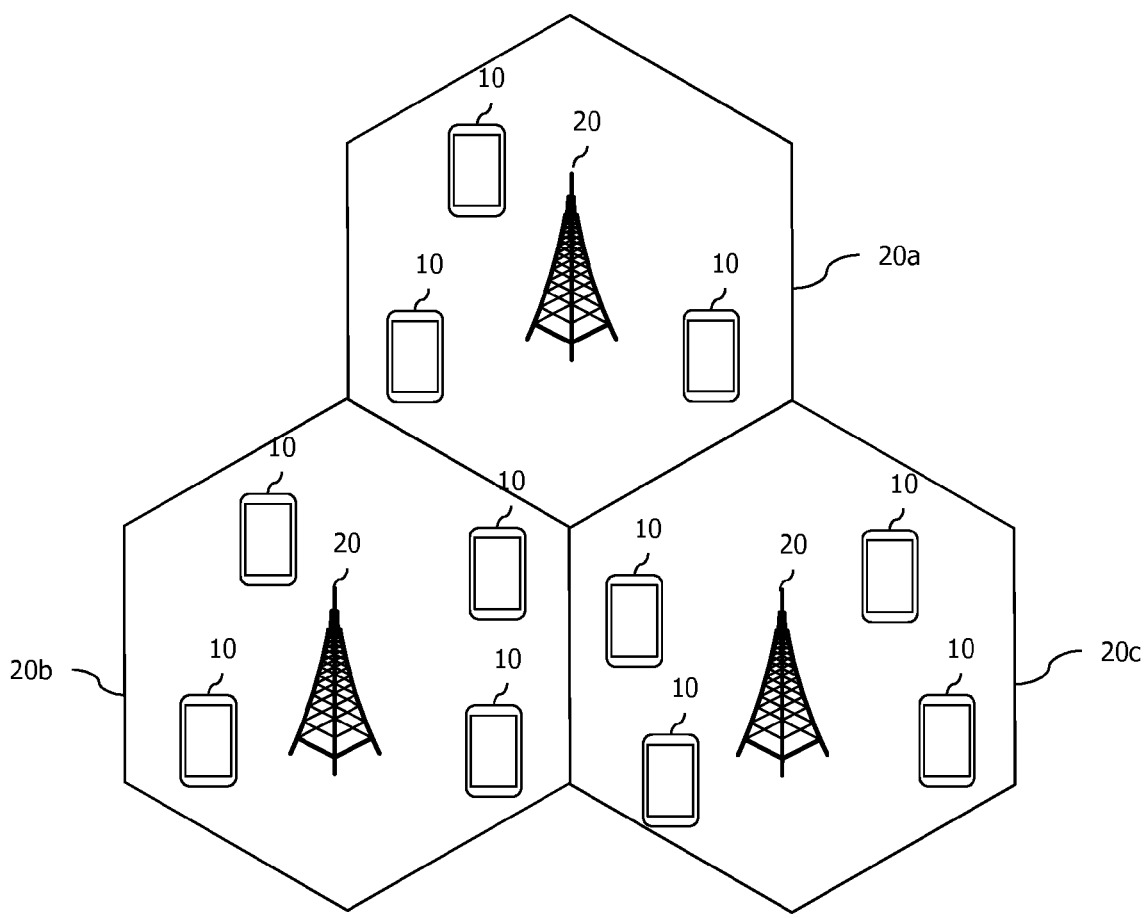
FIG. 1 shows a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
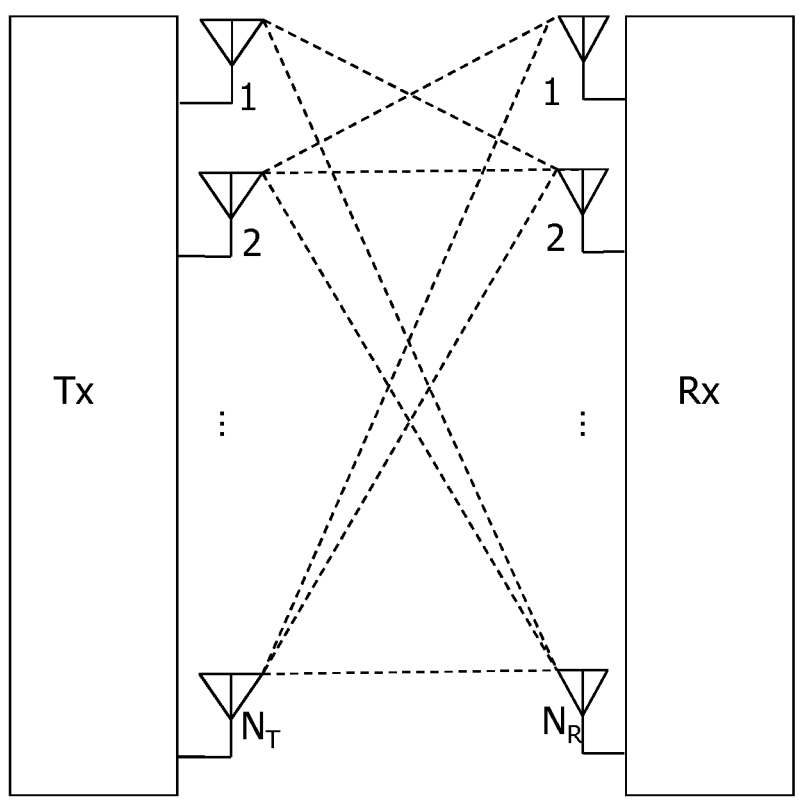
FIG. 2 illustrates a general multiple antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \quad \text{[Equation 1]}$$

If $N_T$ denotes the number of Tx antennas, transmission information may consist of up to $N_T$ different pieces of information. In this case, the transmission information may be expressed by Equation 2 below.

$$s = [s_1, s_2, \ldots s_{N_T}]^T \quad \text{[Equation 2]}$$

In Equation 2, s denotes a transmission information vector, and $s_1, s_2, \ldots s_{NT}$ denote information indicating each element of the transmission information vector. The respective information may be transmitted with different transmission power. When each transmission power is denoted by $(P_1, P_2, \ldots, P_{NT})$, the transmission information vector to which the transmission power is allocated may be expressed by Equation 3 below.

$$\hat{s} = [\hat{s}_1, \hat{s}_2, \ldots, \hat{s}_{N_T}]^T = [P_1 s_1, P_2 s_2, \ldots P_{N_T} s_{N_T}]^T \quad \text{[Equation 3]}$$

Equation 3 may be expressed by the product between a transmission power diagonal matrix and a transmission information vector as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

A transmission information vector $\hat{s}$ to which transmission power is applied is multiplied by a weight matrix W to generate Tx signals $x_1, x_2, \ldots, x_{NT}$ transmitted in practice through $N_T$ Tx antennas. The weight matrix W takes a role of properly distributing transmission information to an individual antenna according to a transmission channel condition. If a Tx signal vector is denoted by x, it may be expressed by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, elements $w_{ij}$ ($1 \le i \le N_T$, $1 \le j \le N_T$) of the weight matrix denote a weight for an $i^{th}$ Tx antenna and $j^{th}$ transmission information. The weight matrix W is also referred to as a precoding matrix.

The Tx signal vector may include different transmission information according to a transmission scheme. For example, when applying spatial diversity, i.e., transmission diversity, all elements of the Tx signal vector may have the same transmission information. That is, $[s_1, s_2, \ldots s_{nT}]$ may be the same information, for example, $[s_1, s_1, \ldots s_1]$.

Therefore, since the same transmission information is delivered to a receiver through a different channel, a diversity effect occurs, and transmission reliability increases.

Alternatively, when applying the spatial diversity, all elements of the transmission information of the Tx signal vector may be different from one another. That is, $s_1$, $s_2, \ldots s_{nT}$ may be different information. Since different transmission information is delivered to the receiver through a different channel, advantageously, there is an increase in an amount of information that can be transmitted.

Of course, the transmission information may be delivered by using spatial multiplexing together with the spatial diversity. That is, in the above example, the same information is transmitted by using the spatial diversity through three Tx antennas, and different information may be transmitted by using the spatial multiplexing through the remaining Tx antennas. In this case, the transmission information vector may be configured such as $[s_1, s_1, s_1, s_2, s_3 \ldots, s_{nT-2}]$.

If $N_R$ denotes the number of Rx antennas in the receiver, a signal received in an individual Rx antenna may be denoted by $y_n (1 \le n \le N_R)$. In this case, an Rx signal vector y may be expressed by Equation 6 below.

$$y = [y_1, y_2, \ldots y_{N_R}]^T \quad \text{[Equation 6]}$$

When performing channel modeling in the MIMO system, each channel may be identified by using an index of a Tx antenna and an index of an Rx antenna. If the index of the Tx antenna is denoted by j and the index of the Rx antenna is denoted by i, a channel between the Tx antenna and the Rx antenna may be denoted by $h_{ij}$ (herein, it should be noted that the index of the Rx antenna is first indicated in a subscript indicating the channel and the index of the Tx antenna is indicated later).

Figure 3:
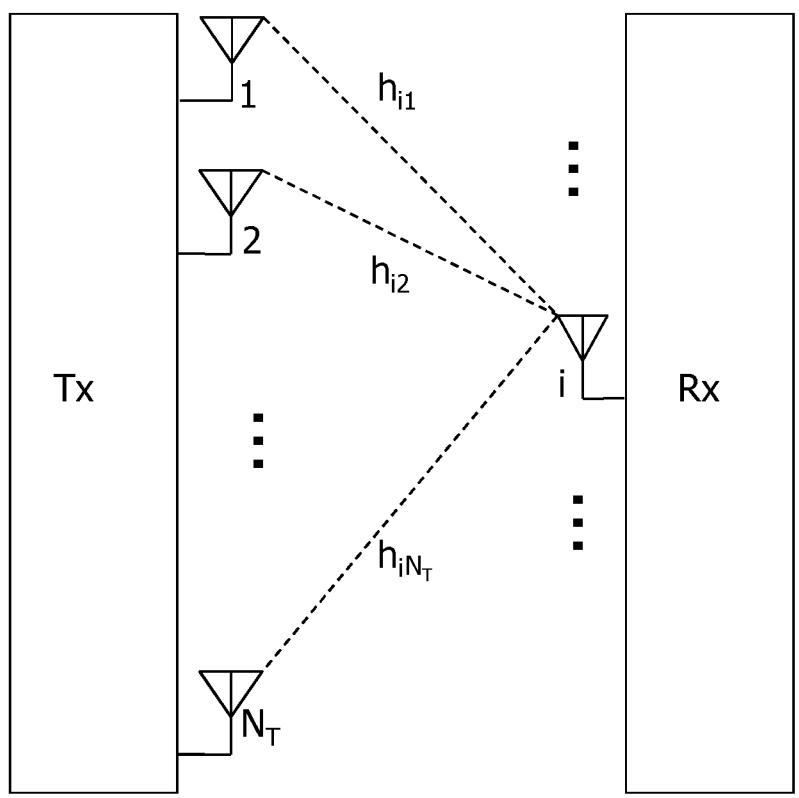
FIG. 3 illustrates an example of indicating a channel in a multi-antenna system.

FIG. 3 illustrates an example of indicating a channel in a multi-antenna system.

Referring to FIG. 3, channels for respective $N_T$ Tx antennas with respect to an Rx antenna i are denoted by $h_{i1}$, $h_{i2}, \ldots h_{iNT}$. For convenience of explanation, the channels may be expressed as a matrix or a vector. Then, the channels $h_{i1}, h_{i2}, \ldots h_{iNT}$ may be expressed in a vector form as shown in Equation 7 below.

$$h_i^T = [h_{i1}, h_{i2}, \ldots h_{iN_T}] \quad \text{[Equation 7]}$$

If all channels from $N_T$ Tx antennas to $N_R$ Rx antennas are expressed in a matrix form as a channel matrix H, the channel matrix H may be expressed by Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

A signal transmitted through a Tx antenna is transmitted through a channel expressed by Equation 8 above and is received in an Rx antenna. In this case, noise is added in an actual channel. Mathematically, the noise can be regarded as an additive white Gaussian noise (AWGN). If AWGNs added to respective Rx antennas are denoted by $n_1, n_2, \ldots n_{NR}$, for convenience of explanation, these AWGNs may be expressed as a vector of Equation 9 below.

$$n = [n_1, n_2, \ldots, n_{N_R}]^T \quad \text{[Equation 9]}$$

An Rx signal vector y received in an Rx antenna may be expressed by Equation 10 below by considering the aforementioned AWGN, the Tx signal vector x, a channel matrix, etc.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

In the channel matrix H, the number of rows and the number of columns are determined according to the number of Tx antennas and the number of Rx antennas. In the channel matrix H, the number of rows is equal to the number of Rx antennas. Further, in the channel matrix H, the number of columns is equal to the number of Tx antennas. Therefore, the channel matrix H may be expressed by an $N_R \times N_T$ matrix.

In general, a matrix rank is defined by a smaller value between the number of independent rows and the number of independent columns. Therefore, the matrix rank cannot be greater than the number of columns or the number of rows, and a rank of the channel matrix H is determined by Equation 11 below.

$$\text{rank}(H) \leq \min(N_T, N_R)$$ [Equation 11]

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 4:
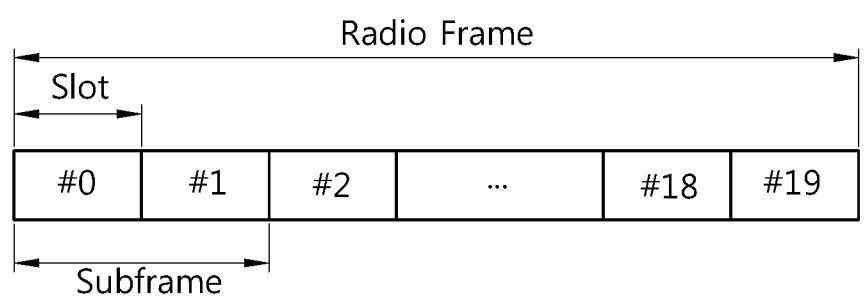
FIG. 4 illustrates the architecture of a radio frame according to frequency division duplex (FDD) in $3^{rd}$ generation partnership project (3GPP) long term evolution (LTE).

FIG. 4 illustrates the architecture of a radio frame according to FDD in 3GPP LTE.

Referring to FIG. 4, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 5:
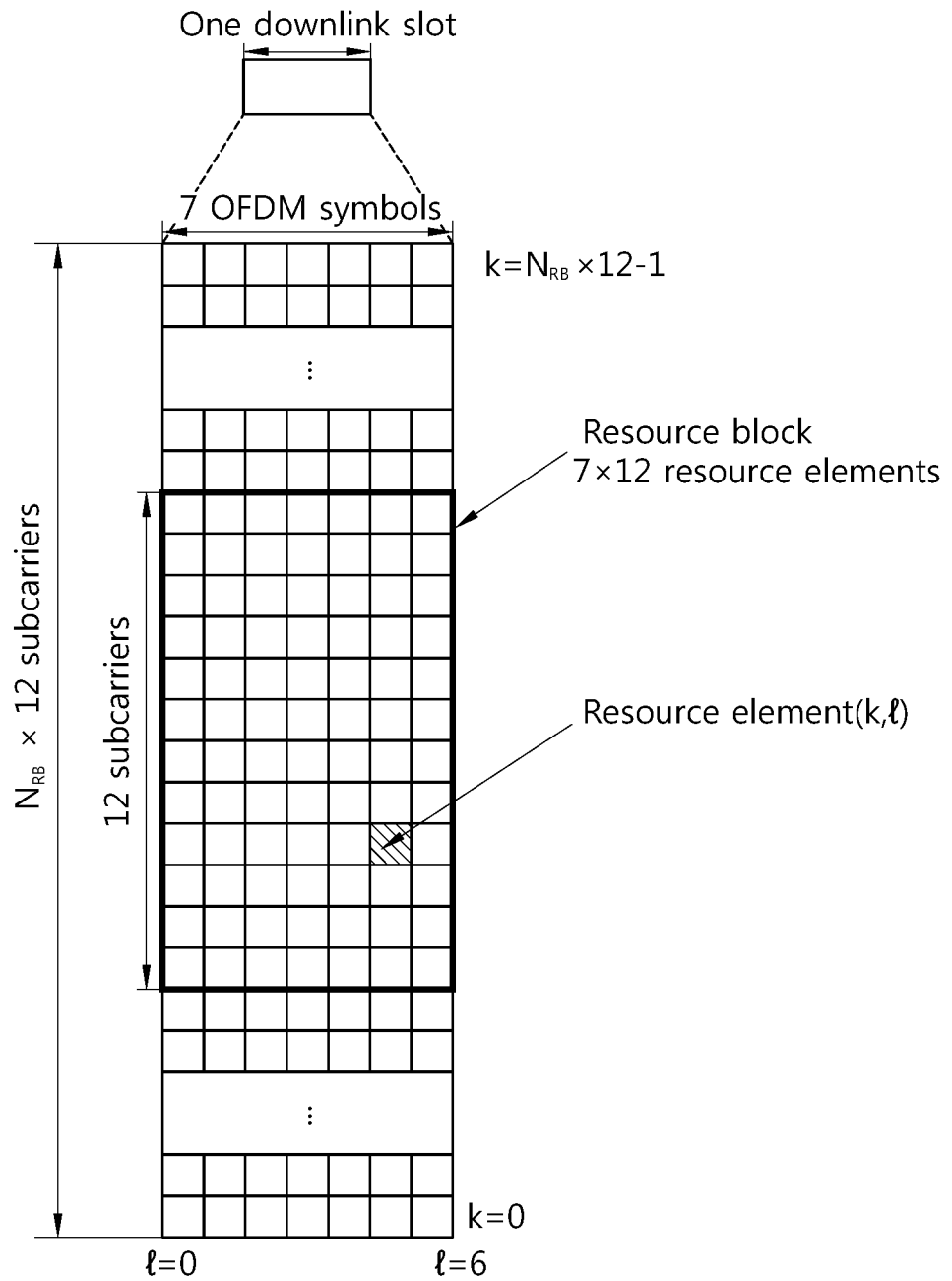
FIG. 5 illustrates an example resource grid for one uplink or downlink slot in 3GPP LTE.

FIG. 5 illustrates an example resource grid for one uplink or downlink slot in 3GPP LTE.

Referring to FIG. 5, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 6:
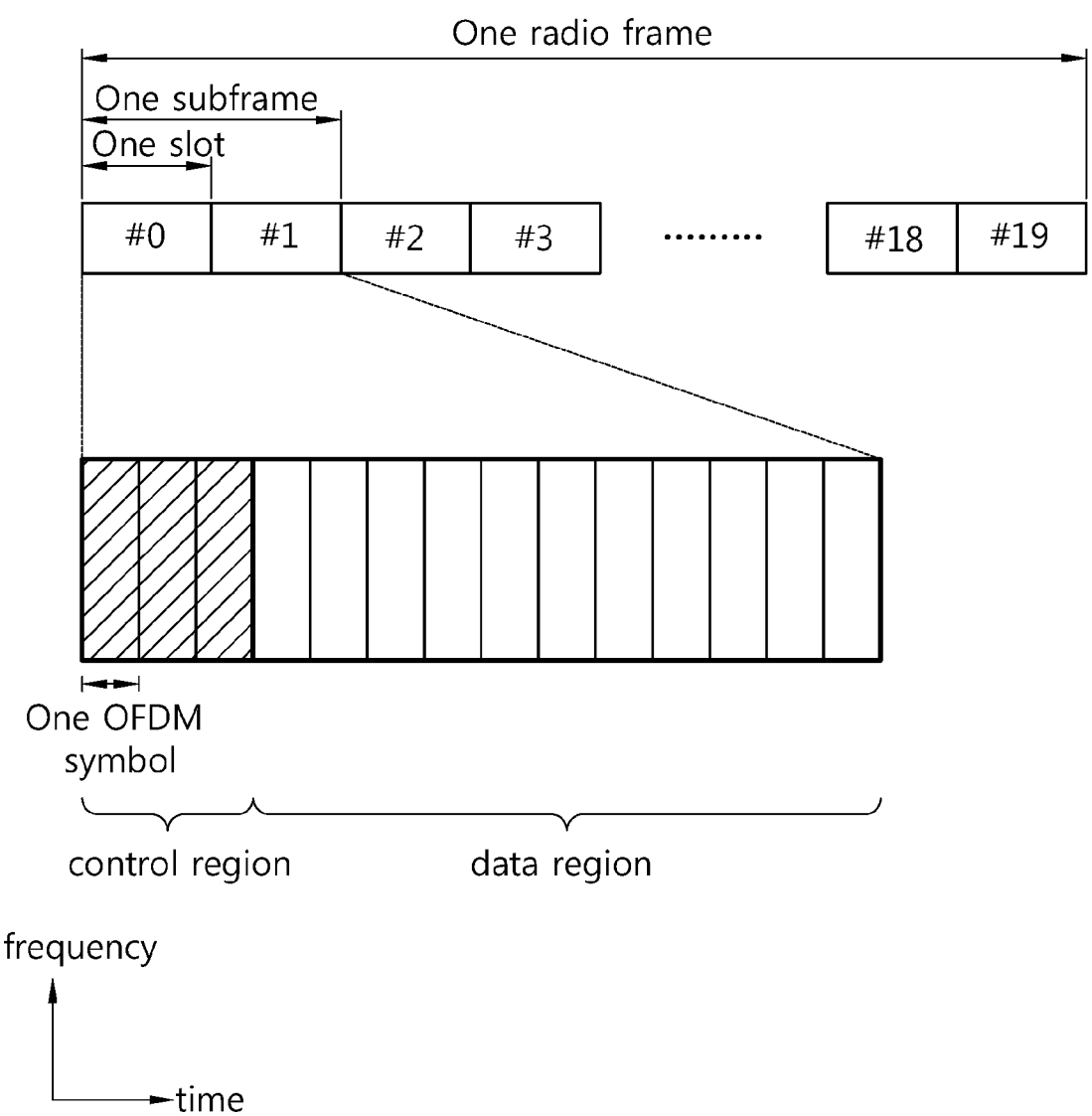
FIG. 6 illustrates the architecture of a downlink sub-frame.

FIG. 6 illustrates the architecture of a downlink subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 7:
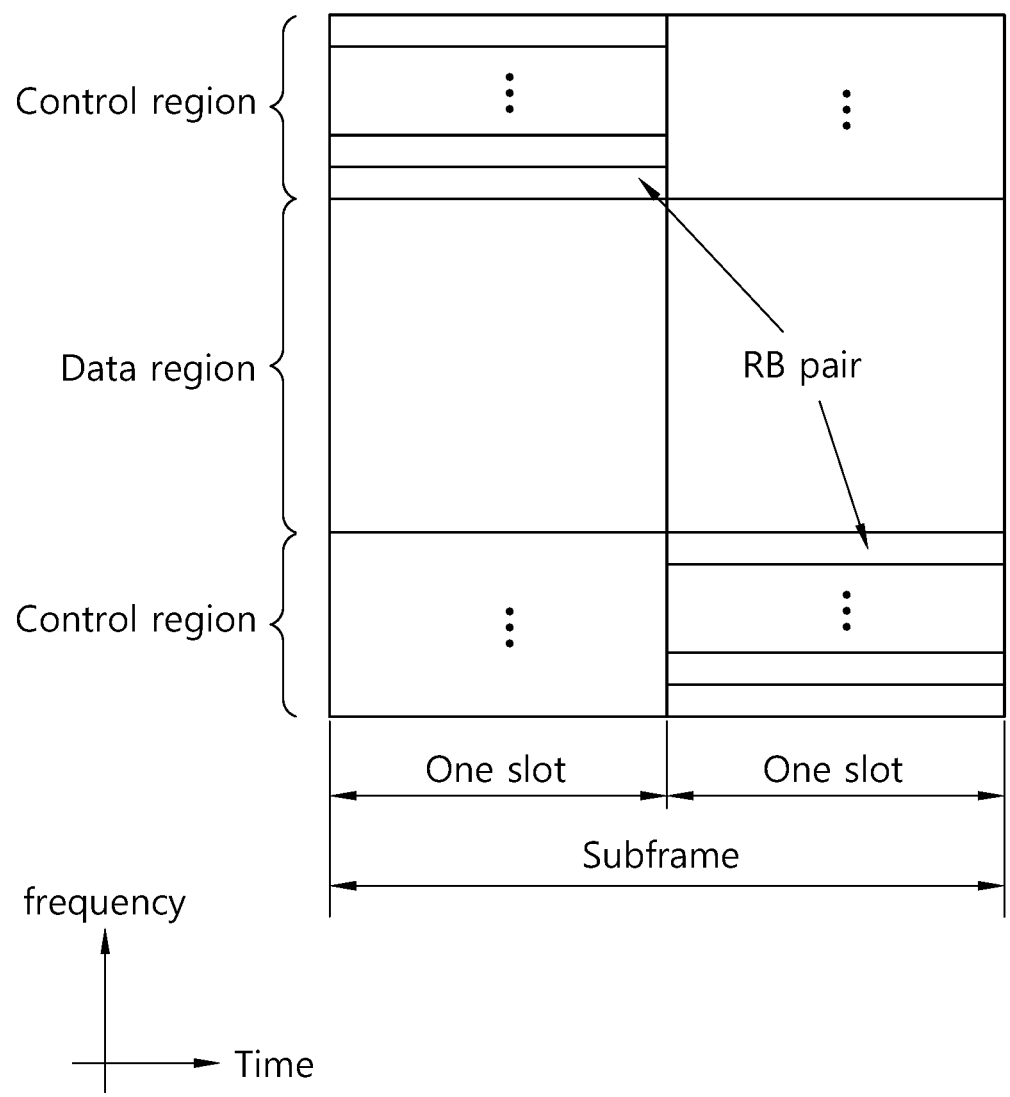
FIG. 7 illustrates the architecture of an uplink sub-frame in 3GPP LTE.

FIG. 7 illustrates the architecture of an uplink sub-frame in 3GPP LTE.

Referring to FIG. 7, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

FIGS. 8a and 8b illustrate an example of comparison between a single carrier system and a carrier aggregation system.

Referring to FIG. 8a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 8a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 8b may correspond to a communication example in an LTE-A system.

Referring to FIG. 8b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 8b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz (UL CC0)+20 MHz (UL CC1)+20 MHz (UL CC2)+20 MHz (UL CC3)+5 MHz (UL CC4), for example. However, without consideration of backward compatibility, a new bandwidth may be defined rather the existing system bandwidth being used, to constitute a broadband.

FIG. 8b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remains activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Meanwhile, a reference signal (RS) will be described hereinafter.

In general, transmission information (e.g., data) is easily distorted and modified while it is transmitted through a radio channel. Therefore, a reference signal (RS) is necessary to demodulate the transmission information in an error-free manner. The RS is a signal pre-known between the transmitter and the receiver and is transmitted together with the transmission information. Since the transmission information transmitted from the transmitter experiences a corresponding channel for each Tx antenna or for each layer, the RS may be allocated for each Tx antenna or for each layer. The RS for each Tx antenna or for each layer may be identified by using a resource (e.g., time, frequency, code, etc.). The RS may be used for two purposes, i.e., transmission information demodulation and channel estimation.

The RS may be classified into two types according to a range of a receiver which knows the RS in advance. A first type of the RS is known to only a specific receiver (e.g., a specific UE), and is called a dedicated RS (DRS). In this sense, the DRS is also called a UE-specific RS. A second type of the RS is known to all receivers in a cell, e.g., all UEs, and is called a common RS (CRS). The CRS is also called a cell-specific RS.

In addition, the RS may be classified according to a usage. For example, an RS used for data demodulation is called a demodulation RS (DM-RS). An RS used for feedback information indicating a channel state (e.g., CQI/PMI/RI) is called a channel state indicator-RS (CSI-RS). The aforementioned DRS may be used as a DM-RS. Hereinafter, it is premised that the DM-RS is a DRS.

Figure 9:
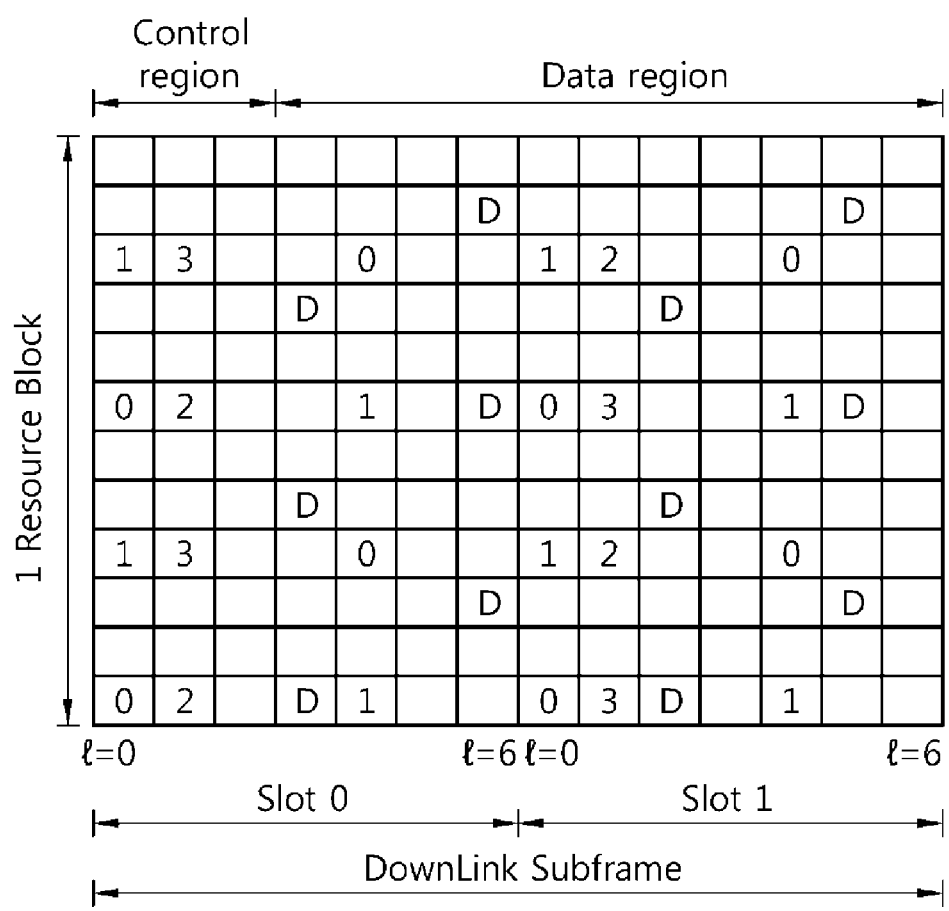
FIG. 9 illustrates an example of a reference signal (RS) structure capable of supporting four antenna ports in case of using a normal cyclic prefix (CP).
Figure 10:
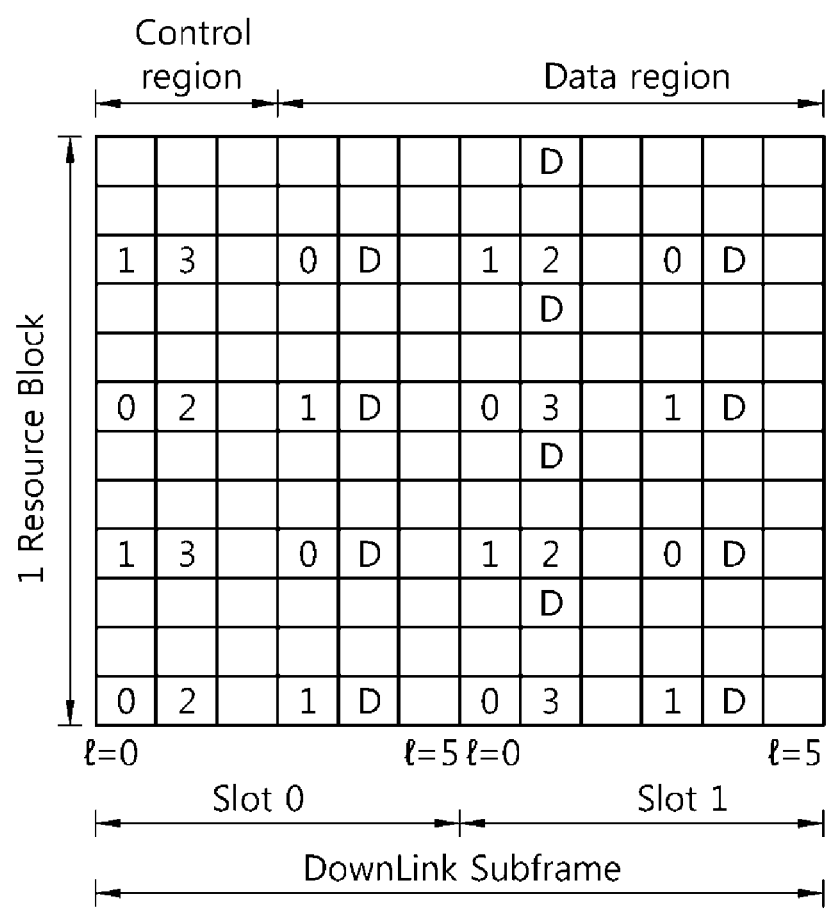
FIG. 10 illustrates an example of an RS structure capable of supporting four antenna ports in case of using an extended CP.

FIG. 9 illustrates an example of an RS structure capable of supporting four antenna ports in case of using a normal CP. FIG. 10 illustrates an example of an RS structure capable of supporting four antenna ports in case of using an extended CP.

The RS structures of FIG. 9 and FIG. 10 are RS structures used in the conventional 3GPP LTE system.

In FIG. 9 and FIG. 10, a resource element indicated by any one of values 0 to 3 indicates a resource element for transmitting a cell-specific RS (CRS). In this case, any one value in the range of 0 to 3 indicates a supported antenna port. That is, resource elements marked with p (where p is any one of values 0 to 3) are resource elements to which a CRS for an antenna port 0 is mapped. The CRS is used for channel measurement and data demodulation for each antenna port. The CRS is transmitted in both a control region and a data region of a subframe.

In FIG. 9 and FIG. 10, a resource element marked with 'D' indicates a resource element to which a UE-specific RS (i.e., a DRS) is mapped. The UE-specific RS may be used in single-antenna port transmission of a PDSCH. A UE receives an indication on whether the UE-specific RS is transmitted through a high-layer signal, and if the PDSCH is transmitted, whether the UE-specific RS is valid. The UE-specific RS may be transmitted only when data demodulation is necessary. The UE-specific RS may be transmitted only in a data region of a subframe.

On the other hand, recently, there is an ongoing discussion on a heterogeneous network in which a macro cell and a small cell co-exist. In particular, there is an ongoing discussion for traffic offloading by distributing terminals connected to the macro cell to the small cell.

Figure 11:
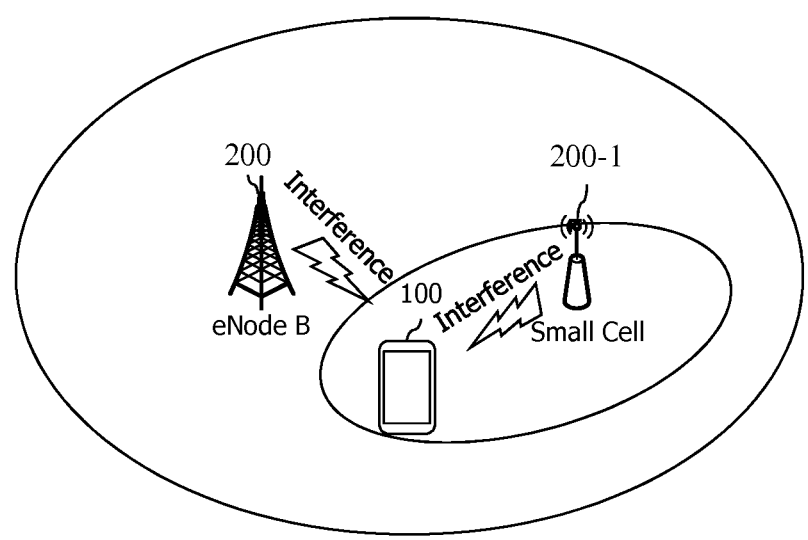
FIG. 11 illustrates a heterogeneous network including a macro cell and a small cell.

FIG. 11 illustrates a heterogeneous network including a macro cell and a small cell.

A heterogeneous network in which a small cell (e.g., a pico cell, a femto cell, or a micro cell) having lower-power transmit power exists in the existing marco cell coverage in an overlapping manner is under discussion in a next-generation communication standard including 3GPP LTE-A.

Referring to FIG. 11, the macro cell may overlap with one or more micro cells. A service of the macro cell is provided by a macro eNodeB (MeNB). In the present specifiction, the macro cell and the MeNB may be used together. A UE connected to the macro cell may be referred to as a macro UE. The marco UE receives a downlink signal from the MeNB, and transmits an uplink signal to the MeNB.

The aforementioned small cell is also referred to as a femto cell, a pico cell, or a macro cell. A service of the small cell is provided by a pico eNodeB, a home eNodeB (HeNB), a relay node (RN), etc. For convenience, the pico eNodeB, the HeNB, and the RN are collectively referred to as the HeNB. In the present specifiction, the macro cell and the HeNB may be used together.

The heterogeneous network has an inter-cell interference problem since the macro cell and the small cell overlap. As illustrated, if the UE is located in a boundary of the macro cell and the small cell, a downlink signal from the macro cell may act as an interference. Similarly, a downlink signal of the small cell may also act as an interference.

For a more specific example, when the UE 100 connected to the small cell 300 is located in a boundary of the small cell, the connection with the small cell 300 may be disconnected due to an interference from the macro cell 200. This implies that a coverage of the small cell 300 is smaller than expected.

For another example, if the UE 100 connected to the macro cell 200 is located in an area of the small cell 300, the connection with the macro cell 200 may be disconnected due to an interference from the small cell 300. This implies that a shadow area exists in the macro cell 200.

In the most fundamental method for solving such an interference problem, different frequencies are used between cells. However, since a frequency is a rare and expensive resource, a method of solving the problem by using a frequency division is not much welcomed by a vendor.

Therefore, 3GPP intends to solve such an inter-cell interference problem through a time division.

Accordingly, an enhanced inter-cell interference coordination (eICIC) is actively under research recently as one of interference coordination methods in 3GPP.

The time division method introduced in LTE release-10 is called an enhanced inter-cell interference coordination (ICIC) in a sense that it is more enhanced than the conventional frequency division method. In this method, an interfering cell is called an aggressor cell or a primary cell, and an interfered cell is defined as a victim cell or a secondary cell. The aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops signal transmission as to a UE which experiences a significantly high interference in a certain area, so that an interference signal is almost not sent.

Meanwhile, a specific subframe in which the data transmission stops is called an almost blank subframe (ABS). No data is transmitted other than essential control information in a subframe corresponding to the ABS. For example, the essential control information is a cell-specific reference signal (CRS). In the current 3GPP LTE/LTE-A standard, the CRS signal exists only in OFDM symbols #0, #4, #7, and #11 in each subframe on a time axis. Accordingly, in the subframe to which the ABS is applied, only the CRS signal is transmitted on the OFDM symbols #0, #4, #7, and #11.

Figure 12:
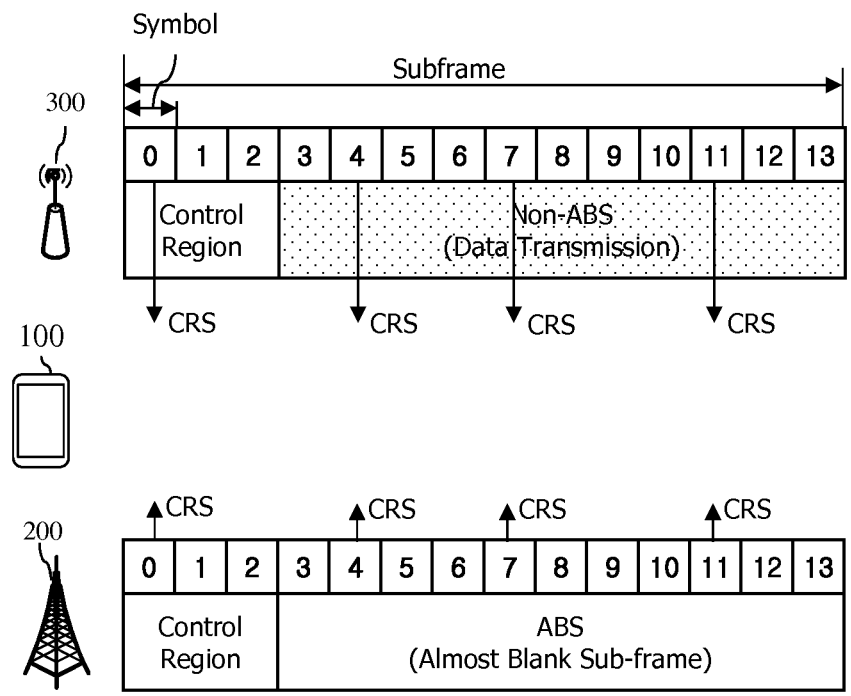
FIG. 12 illustrates an example of an enhanced inter-cell interference coordination (eICIC) for handling interference between base stations (BSs).

FIG. 12 illustrates an example of an enhanced inter-cell interference coordination (eICIC) for handling interference between BSs.

Referring to FIG. 12, a macro cell, i.e., the eNodeB 200, operates a subframe as an ABS.

The small cell 300 corresponding to the aforementioned pico cell performs data transmission in a data region of the subframe. A CRS is transmitted on symbols #0, #4, #7, and #11.

On the other hand, when the eICIC is applied, the subframe is operated based on the ABS, and thus the macro cell, i.e., the eNodeB 200, may not transmit any data in the data region. However, only the CRS may be transmitted on the subframe which is operated based on the ABS.

As described above, in addition to solving an inter-cell interference problem by using the eICIC scheme, there may be a method of adding an interference cancellation capability to the UE 100. Hereinafter, the method of adding the interference cancellation capability is described.

Figure 13:
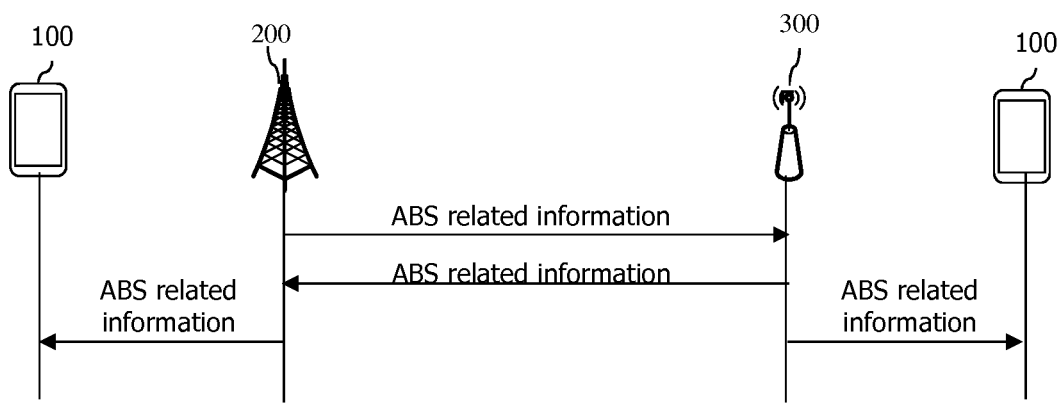
FIG. 13 illustrates an example of exchanging information related to an almost blank subframe (ABS) subframe.

FIG. 13 illustrates an example of exchanging information related to an ABS subframe.

As can be seen with reference to FIG. 13, ABS related information may be exchanged between a macro cell 200 and a small cell 300 through an X2 interface.

In addition, each of the macro cell 200 and the small cell 300 may deliver the ABS related information to its serving UE 100.

Each of the macro cell 200 and the small cell 300 may configure a measurement subset for its serving UE 100 on the basis of one or more of its ABS related information and counterpart's ABS relation information, and thereafter may deliver it.

The corresponding cells 200 and 300 do not transmit a downlink signal on a downlink subframe which is set to the ABS, or transmit the downlink signal with decreased power. Therefore, a level of interference having an effect within the coverage of another cell may be decreased in comparison with a downlink subframe which is not set to the ABS. Since the level of the interference may vary depending on whether the subframe is set to the ABS, the UE 100 must perform a measurement only on a predetermined specific subframe.

For this, on the basis of one or more of its ABS pattern information and counterpart's ABS pattern information, each of the cells 200 and 300 may instruct its serving UE 100 to perform a measurement only in a specific subframe. This is called a restricted measurement. The instruction may be delivered through a higher layer signal. The higher layer signal may be an RRC signal. The signal may be a CQI-ReportConfig element.

The ABS related information includes ABS information and an ABS status.

First, the ABS information may include one or more of information elements shown in the following table for example. The ABS pattern information is information which represents a subframe to be used as an ABS in a bitmap format. It may be configured with a bitmap of 40 bits in case of FDD and up to 70 bits in case of TDD. For example, in FDD, the 40 bits indicate 40 subframes, and if a bit value is 1, it indicates an ABS, and if the bit value is 0, it indicates a non-ABS subframe. A measurement subset is a subset of ABS pattern information, and is configured with a bitmap of 40 bits in the FDD case and up to 70 bits in the TDD case. Such a measurement subset is to configure a restricted measurement to a corresponding UE.

TABLE 1

| IE | Description |
| --- | --- |
| ABS Pattern Info | At each position of the bitmap, a value "1" indicates 'ABS', and a value "0" indicates 'non-ABS'. A first position of the ABS pattern corresponds to subframe 0 in a radio frame where SFN = 0. The ABS pattern is continuously repeated in all radio frames. The maximum number of subframes is 40. |
| Measurement Subset | It indicates a subset of the ABS Pattern Info, and is used to configure specific measurements for the UE. |
| ABS Inactive | It indicates that interference coordination by means of ABS is not active. |

Next, the ABS status is used to allow a corresponding cell to determine whether to change an ABS pattern. Usable ABS pattern information is a subset of ABS pattern information, and also consists of a bitmap. The Usable ABS pattern information indicates whether a subframe designated as an ABS is properly used for a purpose of an interference mitigation. The downlink ABS status is a ratio of the number of downlink resource blocks (RBs) scheduled in a subframe indicated in the usable ABS pattern information and RBs allocated for a UE which must be protected using the ABS, and indicates how effectively the ABS is utilized in a victim cell according to an original purpose.

TABLE 2

| IE | Description |
| --- | --- |
| DL ABS status | Percentage of used ABS resources. The numerator of the percentage consists of resource blocks within the ABS indicated in the Usable ABS Pattern Info, and the denominator of the percentage is the total number of resource blocks within the ABS indicated in the Usable ABS Pattern Info. |
| Usable ABS Pattern Info | Each position in the bitmap represents a subframe. A value "1" indicates 'ABS' designated as being protected from inter-cell interference, and a value "0" is used for all other subframes. The pattern represented by the bitmap is a subset of, or the same as, the corresponding ABS Pattern Info. |

A measurement subset consisting of a subset of the ABS pattern information is a subframe used as an ABS. Other subframes may autonomously determine whether a corresponding cell is utilized as an ABS according to a traffic load.

As described above, in addition to solving an inter-cell interference problem by using the eICIC scheme, there may be a method of adding an interference cancellation capability to the UE 100.

Since inter-cell interference is decreased when using the interference cancellation capability, the coverage of the small cell can be extended. Details thereof will be described below with reference to FIG. 14.

Figure 14:
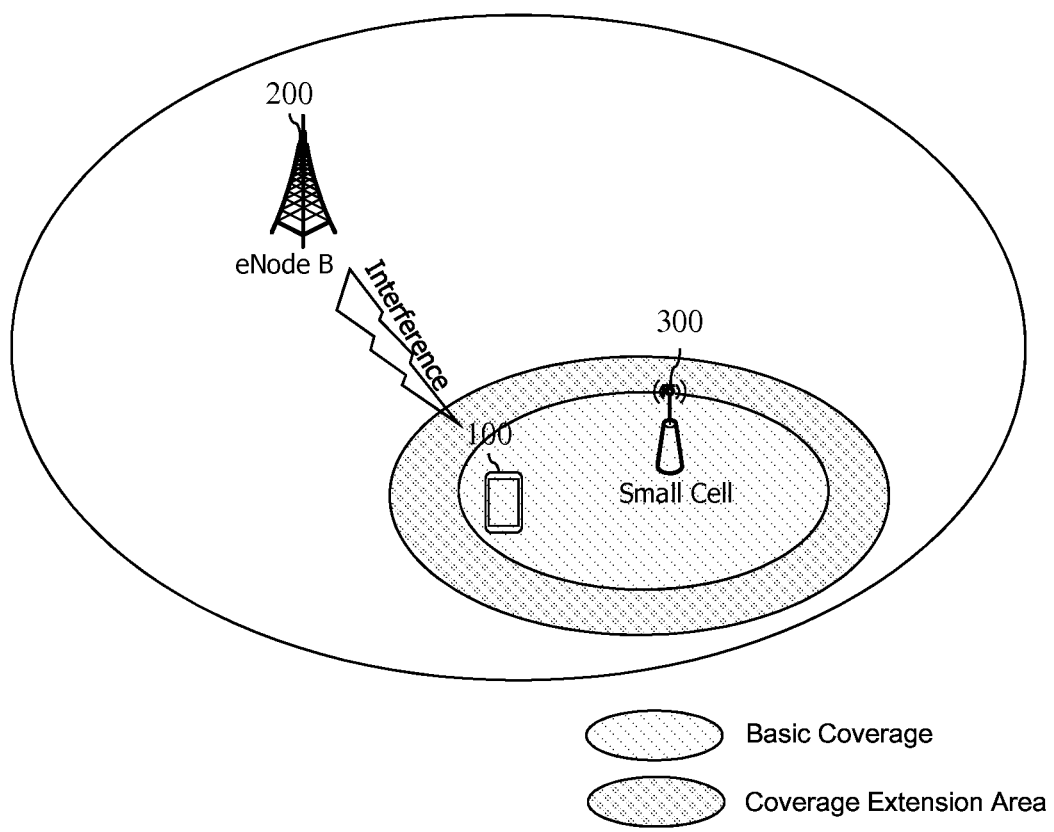
FIG. 14 illustrates the concept of coverage expansion of a small cell according to one disclosure of the present specification.

FIG. 14 illustrates the concept of coverage expansion of a small cell according to one disclosure of the present specification.

Referring to FIG. 14, a BS (e.g., pico eNodeB) 300 of several small cells may be installed within a coverage of a BS (e.g., eNodeB) 200 of a macro cell. Further, if a UE 100 which receives a service from the BS 200 of the macro cell exists within the coverage of the BS 300 of the small cell, a handover to the BS 300 of the small cell is allowed, thereby being able to have an effect of offloading traffic of the BS 200 of the macro cell.

Herein, a handover from the BS 200 of the macro cell corresponding to a serving BS to the BS 300 of the small cell corresponding to a target BS is achieved when strength of a reference signal of the target signal is greater than or equal to a specific threshold on the basis of strength (RSRP, RSRQ) of a reference signal received by the UE 100 from the serving BS.

Meanwhile, by additionally using any means or by improving the capability of the UE 100, the handover to the target BS may be achieved even if the received reference signal strength of the target BS is not higher than the received reference signal strength of the serving BS by the threshold. Such an operation eventually leads to an effect of expanding a cell range or a cell radius of the BS (e.g., the pico eNodeB) 300 of the small cell corresponding to the target BS. In the figure, a coverage expansion area wider than a basic coverage of the small cell 300 is indicated by a slashed area. Such a coverage expansion area may be called a cell range expansion (CRE).

Herein, if a threshold used in a typical handover is expressed by $S_{th\_conv}$, an area in which CRE is possible may be expressed as an area which satisfies $S_{th\_conv} <= S_{received} <= S_{th\_CRE}$.

Meanwhile, reception strength for the reference signal from the small cell 300 may be expressed as RSRP/RSRQ measured by the UE 100.

As such, since a basic coverage of the small cell 300 is extended by using the interference cancellation capability of the UE 100, an effect of offloading traffic of the BS 200 of the macro cell can be obtained.

In other words, when using the interference cancellation of the UE 100, a handover can be achieved to the small cell even if strength of a reference signal received from the small cell is not higher by at least a threshold than strength of a reference signal received from the macro cell.

Hereinafter, a method of adding an interference cancellation capability will be described.

Figure 15:
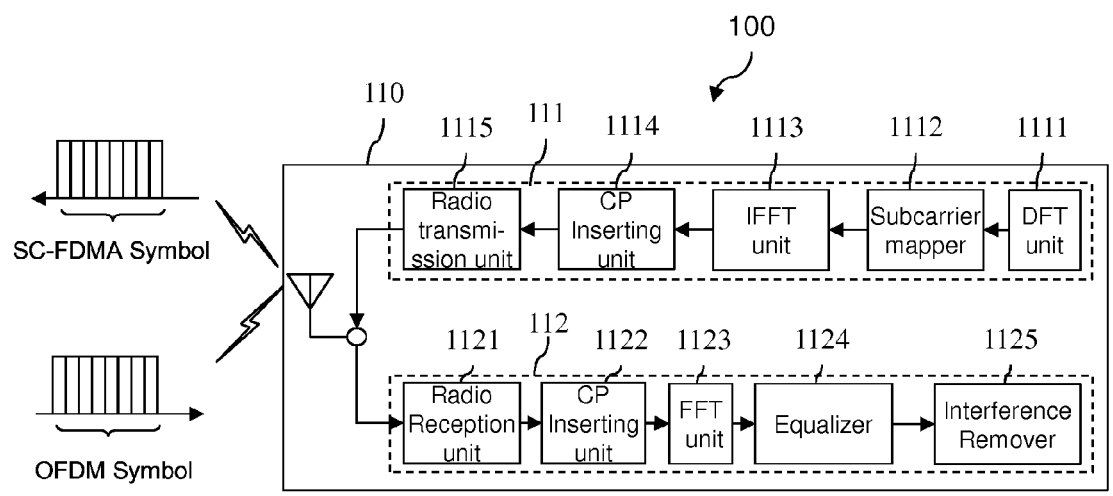
FIG. 15 is a block diagram illustrating the structure of user equipment (UE) according to one embodiment of the present specification.

FIG. 15 is a block diagram illustrating the structure of UE according to one embodiment of the present specification.

In LTE or LTE-A, OFDM is used for a downlink and SC-FDMA similar to OFDM is used for an uplink.

SC-FDMA may also be referred to as discrete Fourier transform (DFT)-spread OFDM (DFT-s OFDM). When SC- is used, non-linear distortion of a power amplifier may be avoided, thus improving transmission power efficiency in a power consumption-limited terminal. Accordingly, user throughput may be enhanced.

SC-FDMA is substantially similar to OFDM in that SC-FDMA transmits signals via separate subcarriers using a Fast Fourier transform (FFT) and inverse FFT (IFFT). A conventional OFDM transmitter has a problem that signals in respective subcarriers on the frequency axis are converted into signals on the time axis by IFFT. That is, IFFT is a scheme of performing the same operation in parallel, and thus peak-to-average power ratio (PAPR) increases. To prevent increase in PAPR, SC-FDMA performs IFFT after DFT spreading, unlike OFDM. That is, a transmission mode in which IFFT is performed after DFT spreading is defined as SC-FDMA. Further, SC-FDMA is also referred to as DFT spread OFDM (DFT-s-OFDM).

SC-FDMA secures robustness to a multipath channel due to a similar structure to OFDM and basically resolves a disadvantage of conventional OFDM that is increase in PAPR by IFFT, thereby allowing efficient use of a power amplifier.

Referring to FIG. 15, the UE 100 includes a radio frequency (RF) unit 110. The RF unit 110 includes a transmitter 111 and a receiver 112. The transmitter 111 includes a discrete Fourier transform (DFT) unit 1111, a subcarrier mapper 1112, an IFFT unit 1113, a cyclic prefix (CP) insertion unit 1114, and a wireless transmission unit 1115. The transmitter 111 of the RF unit 110 may further include, for example, a scramble unit, a modulation mapper, a layer mapper, and a layer permutator, which may be disposed before the DFT unit 1111. That is, as described above, to prevent increase in PAPR, the transmitter of the RF unit 110 subjects data to the DFT unit 1111 before mapping a signal to a subcarrier. The signal spread (or precoded) by the DFT unit 1111 is mapped onto a subcarrier by the subcarrier mapper 1112 and subjected to the IFFT unit 1113 into a signal on the time axis.

That is, in SC-FDMA, unlike OFDM, PAPR of a signal in the time domain obtained via the IFFT unit 1113 is not substantially increased by correlations between the DFT unit 1111, the subcarrier mapper 1112, and the IFFT unit 1113, thereby providing favorable transmission power efficiency. That is, in SC-FDMA, PAPR or cubic meter (CM) may be decreased.

The DFT unit 1111 performs DFT on input symbols to output complex-valued symbols. For example, when Ntx symbols are input (here, Ntx is a natural number), DFT has a size of Ntx. The DFT unit 1111 may be referred to as a transform precoder. The subcarrier mapper 1112 maps the complex-valued symbols onto respective subcarriers in the frequency domain. The complex-valued symbols may be mapped onto resource elements corresponding to resource blocks allocated for data transmission. The subcarrier mapper 1112 may be referred to as a resource element mapper. The IFFT unit 1113 performs IFFT on the input symbols to output a baseband signal for data as a signal in the time domain. The CP insertion unit 1114 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

Meanwhile, the 3GPP is actively carrying out standardization of LTE-Advanced, evolving from LTE, for which clustered DFT-s-OFDM allowing non-contiguous resource allocation is adopted.

Clustered DFT-s-OFDM is a modification of existing SC-FDMA, which divides data symbols having been subjected to a precoder into a plurality of sub-blocks and separately mapping the sub-blocks in the frequency domain. An important feature of clustered DFT-s-OFDM allows frequency selective resource allocation to deal with a frequency selective fading environment in a flexible manner.

Here, clustered DFT-s-OFDM adopted as an uplink access mode for LTE-Advanced allows non-contiguous resource allocation, unlike SC-FDMA as an uplink access for LTE, and thus transmitted uplink data may be divided into a plurality of cluster units.

That is, the LTE system is configured to maintain a single carrier characteristic in an uplink, whereas the LTE-A system allows non-contiguous allocation of DFT-precoded data to the frequency axis or simultaneous transmissions of a PUSCH and PUCCH.

Meanwhile, the receiver 112 of the RF unit 110 includes a wireless reception unit 1121, a CP cancellation unit 1122, an FFT unit 1123, an equalizer unit 1124, and an interference cancellation unit 1125. The wireless reception unit 1121, the CP cancellation unit 1122, and the FFT unit 1123 of the receiver perform reverse functions of the wireless transmission unit 1115, the CP insertion unit 1114, and the IFFT unit 1113 of the transmitter 111.

The interference cancellation unit 1125 cancels or relieve interference included in a received signal.

Figure 8:
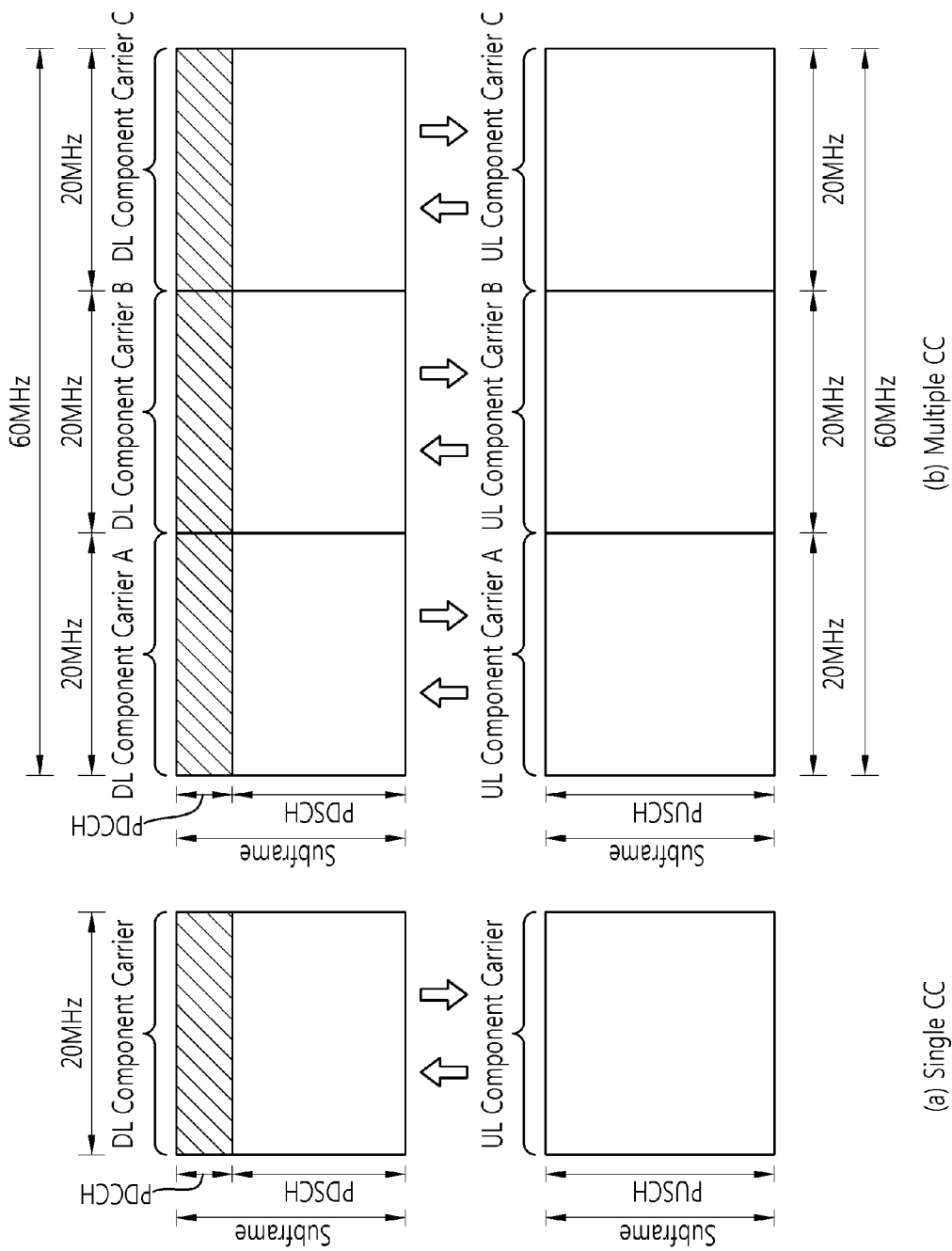
FIG. 8 illustrates an example of comparison between a single carrier system and a carrier aggregation system.

The interference cancellation unit 1125 is added for dealing with an explosively increasing demand for radio data and for canceling interference as in FIG. 8.

Figure 16:
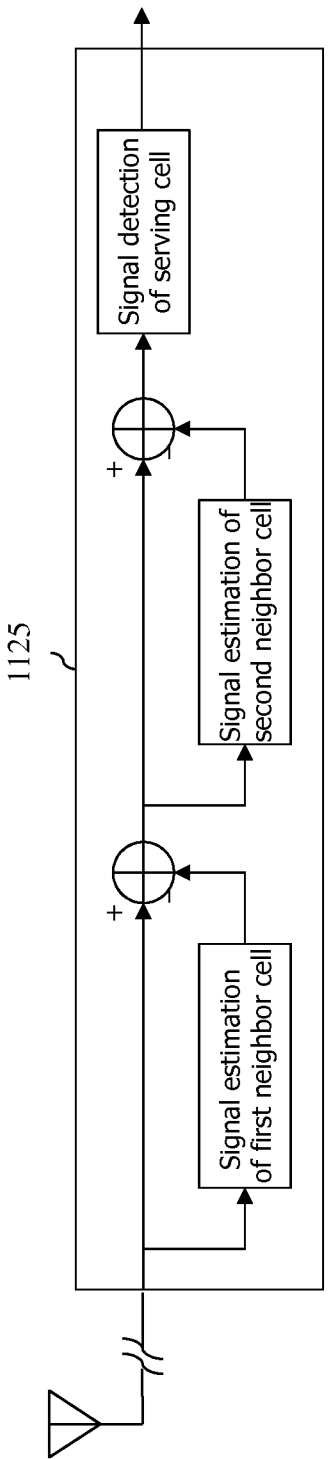
FIG. 16 is a block diagram illustrating operations of the interference cancellation unit shown in FIG. 9.

FIG. 16 is a block diagram illustrating operations of the interference cancellation unit shown in FIG. 9.

As shown in FIG. 16, the receiver 112 additionally including the interference cancellation unit 1125, which is called an interference cancellation (IC) receiver or interference rejection combiner (IRC) receiver, is configured to subtract an interference signal from a received signal.

Here, complexity of the receiver additionally including the interference cancellation unit 1125 depends on a maximum number of cells as an interference cancellation target and kinds of signals to be cancelled. FIG. 10 illustrates operations of performing interference cancellation of up to two interference sources.

Figure 17:
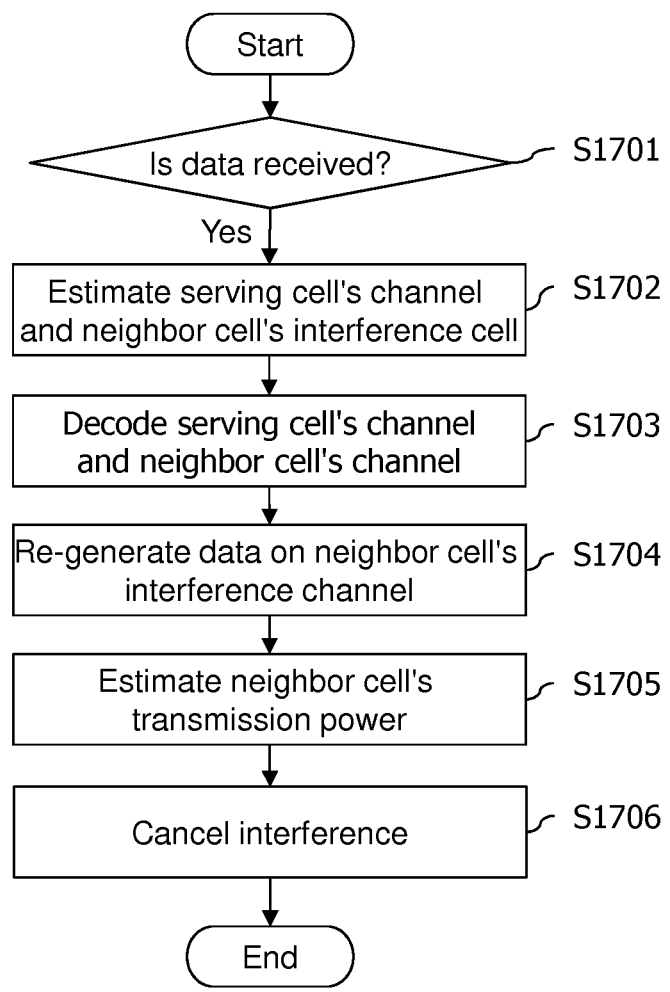
FIG. 17 illustrates an operation of the interference cancellation unit shown in FIG. 15.

FIG. 17 illustrates an operation of the interference cancellation unit shown in FIG. 15.

As can be seen with reference to FIG. 17, when data is received (S1710), the interference cancellation unit 1125 performs channel estimation of a serving cell and interference channel estimation of a neighbor cell (S1702).

In addition, the interference cancellation unit 1125 decodes a serving cell's channel and a neighbor cell's channel (S1703) to acquire data.

In addition, the interference cancellation unit 1125 re-generates data of the neighbor cell (S1704).

In addition, the interference cancellation unit 1125 estimates a power level by which the neighbor cell transmits the data (S1705).

Next, the interference cancellation unit 1125 cancels interference caused by the re-generated neighbor cell's data from data acquired through the decoding by using the estimated power level (S1706), and thus finally obtains only data from the serving cell.

When the interference cancellation capability is used as described above, there is an advantage in that a range can be extended up to 6 dB, that is, cell range extension (CRE) is possible. However, for the interference cancellation, as described above, a channel of a neighbor cell must be estimated (S1702), and data of the neighbor cell must be generated (S1704), which are very complex operations. If a signal to be subjected to the interference cancellation is a cell specific reference signal (CRS), since a UE can know a sequence of the CRS in advance, implementation can be achieved with a relatively low complexity. However, if the signal to be subjected to the interference cancellation is a PBCH or a PDSCH, the UE must perform channel estimation on the PBCH or the PDSCH or re-generate data on the PBCH or the PDSCH. Since this is a very complex operation, there is a big problem in a computation amount.

Moreover, estimating of transmission power used by the neighbor cell requires a very complex algorithm, which may lead to a problem in that there is a significant increase in complexity of the interference cancellation unit 1125 of the UE and a capability for accurate power estimation cannot always be ensured.

In particular, since power of a PDSCH may differ in a UE allocated for each RB, complexity thereof may be further increased.

Accordingly, one disclosure of the present specification allows the serving cell to perform signaling of interference cancellation assistance information, so that the UE can effectively cancel interference caused by a any channel such as a PBCH or PDSCH transmitted from the neighbor cell.

That is, one disclosure of the present specification allows the serving cell to perform signaling of information regarding transmission power of a any channel (i.e., xCH) of the neighbor cell to the UE, so that the UE can improve the interference cancellation capability. The information regarding the transmission power of the any channel (i.e., xCH) may be expressed as xCH-RA and xCH-RB, which respectively imply an xCH-to-RS EPRE ratio for the channel xCH in all transmitted OFDM symbols not containing RS and an xCH-to-RS EPRE ratio for the channel xCH in all transmitted OFDM symbols containing RS. The xCH-RA and the xCH-RB may be used when the UE re-generates data on a any channel from a neighbor cell in order to perform interference cancellation (IC) on the any channel (i.e., xCH). Therefore, if the neighbor cell reports transmission power information (i.e., xCH-RA and xCH-RB) used on the any channel to the serving cell through signaling, complexity of the UE can be decreased. Further, since the UE can effectively perform the IC on the any channel (i.e., xCH), a reception capability can be improved.

Hereinafter, one disclosure of the present specification will be described with reference to the accompanying drawings.

Figure 18A:
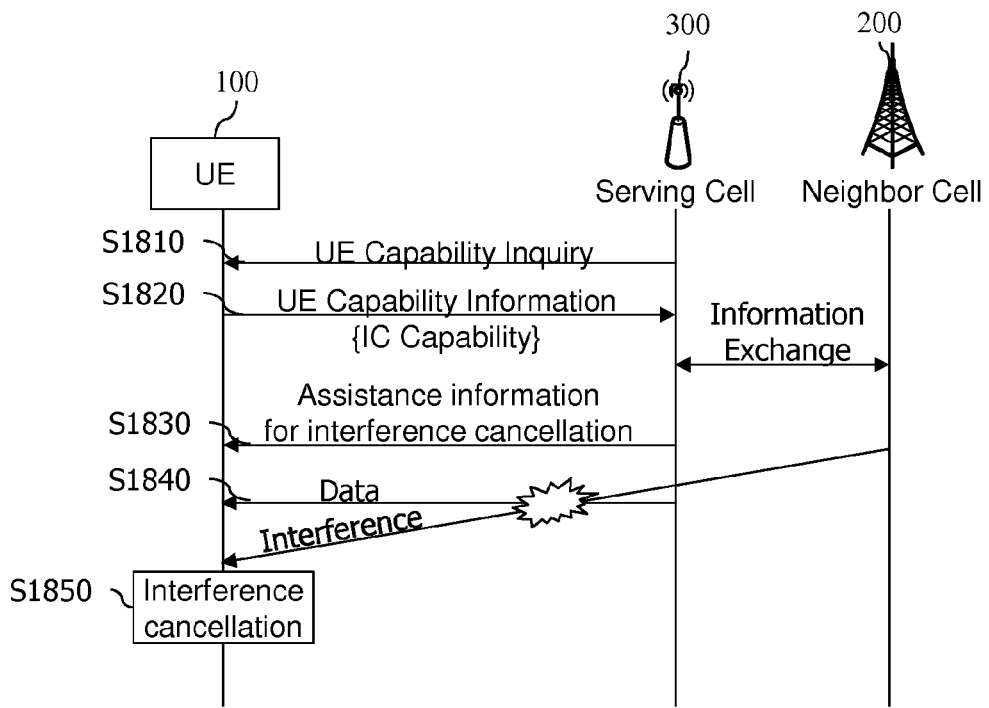
FIG. 18a and FIG. 18b are flowcharts illustrating a method according to one disclosure of the present specification.
Figure 18B:
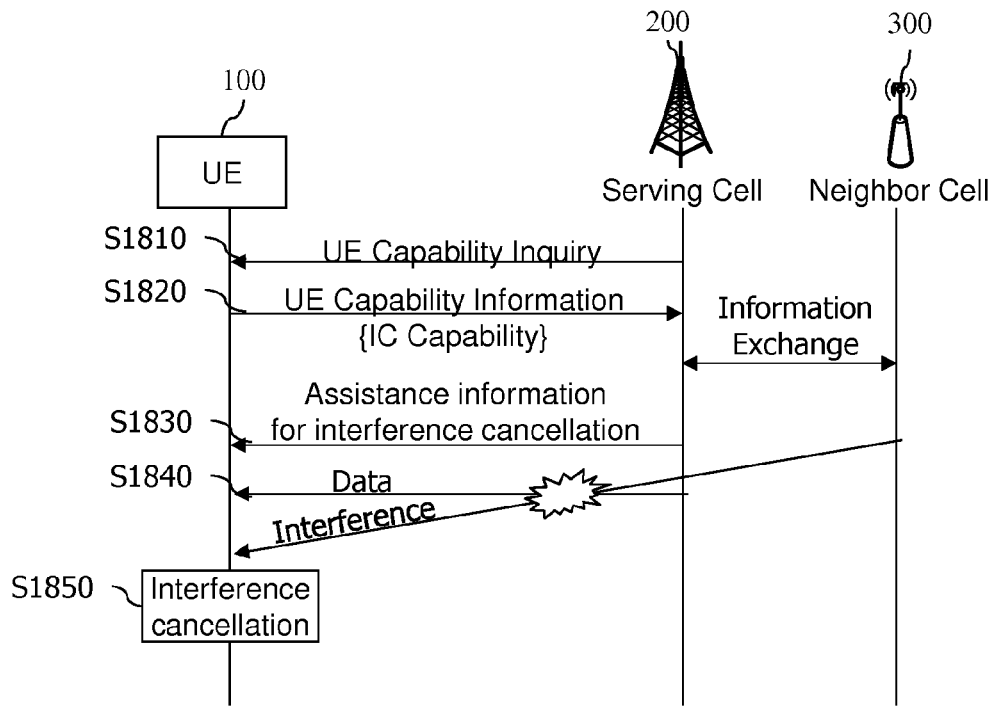

FIG. 18a and FIG. 18b are flowcharts illustrating a method according to one disclosure of the present specification.

Referring to FIG. 18a, a situation where a serving cell is a small cell 300 and a neighbor cell is a macro cell 200 is illustrated. Referring to FIG. 18b, a situation where a serving cell is a macro cell 200 and a neighbor cell is a small cell 300 is illustrated.

As can be seen with reference to FIG. 18a and FIG. 18b, the serving cell requests the UE 100 to check a UE capability optionally according to an instruction of a higher layer (S1810).

Then, the UE 100 provides UE capability information according to the request. That is, in response to the UE capability check, the UE 100a reports that an eICIC capability and an IC capability are present to the serving cell through the UE capability information (S1820). On the other hand, if a radio access capability of the UE 100 is changed, a higher layer of the UE 100 may instruct a higher layer of the serving cell to transmit a capability check request.

Meanwhile, through information exchange with a neighbor cell, the serving cell may confirm whether the neighbor cell is an aggressor cell which causes interference. If the neighbor cell is the aggressor cell which causes the interference, the serving cell acquires information regarding a channel such as a any channel (e.g., PBCH, PDSCH) of the neighbor cell. The acquired information may be transmission power information regarding the channel.

In general, regarding transmission power of a PDSCH, the neighbor cell reports values PA and PB through an RRC signal to a UE served by the neighbor cell. The PA is reported as a UE specific parameter, and the PB is reported as a cell specific parameter. An example of the RRC signal including the values PA and PB is as follows.

TABLE 3

| PDSCH-ConfigCommon ::= | SEQUENCE { |
|---|---|
| referenceSignalPower | INTEGER (-60..50), |
| p-b | INTEGER (0..3) |
| } | |
| PDSCH-ConfigDedicated::= | SEQUENCE { |
| p-a | ENUMERATED {dB-6, dB-4dot77, dB-3, dB-1dot77,dB0, dB1, dB2, dB3} |
| } | |

Therefore, the serving cell acquires the values PA and PB regarding the transmission power of the PDSCH from the neighbor cell.

Next, if there is data to be transmitted to the UE 100, the serving cell transmits interference cancellation assistance information including the acquired transmission power information to the UE 100 (S1830).

Subsequently, the serving cell transmits the data to the UE 100 (S1840).

In this case, if the data transmitted by the serving cell interferes with data transmitted by the neighbor cell, the UE 100 cancels the interference (S1850). The interference cancellation operation (S1850) will be described in greater detail with reference to FIG. 19.

Figure 19:
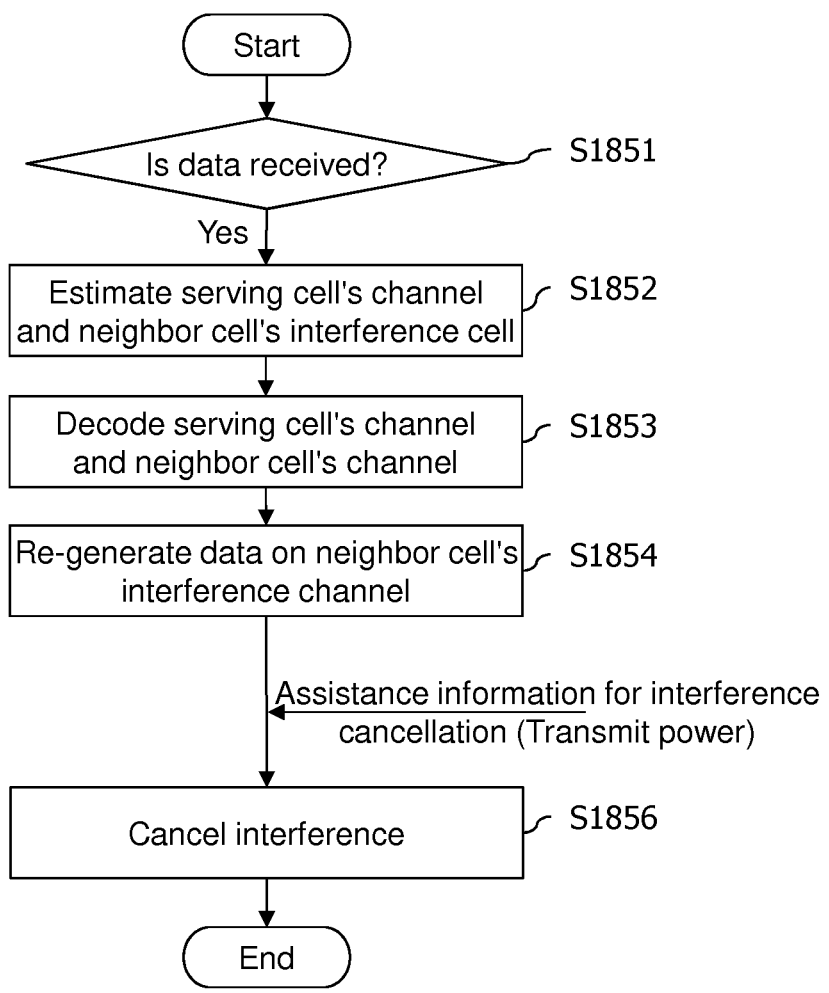
FIG. 19 is a flowchart illustrating an interference cancellation operation shown in FIG. 18a and FIG. 18b in detail.

FIG. 19 is a flowchart illustrating the interference cancellation operation shown in FIG. 18a and FIG. 18b in detail.

As can be seen with reference to FIG. 19, when data is received (S1851), the UE 100 performs channel estimation of a serving cell and interference channel estimation of a neighbor cell (S1852).

In addition, the UE 100 decodes a serving cell's channel and a neighbor cell's channel (S1853) to acquire data.

In addition, the UE 100 re-generates data of the neighbor cell (S1854).

In addition, the UE 100 cancels interference caused by the re-generated neighbor cell's data from data acquired through the decoding by considering transmission power information included in the received interference cancellation assistance information (S1806), and finally obtains only data from the serving cell.

Meanwhile, the interference cancellation assistance information including transmission power information for a any channel of the neighbor cell may be delivered to the UE through an RRC signal. The RRC signal may be, for example, a RadioResourceConfigDedicated signal.

Herein, a value of the transmission power information (i.e., xCH-RA and xCH-RB) for the any channel of the neighbor cell may be expressed as xch_ra and xch_rb on the RRC signal. An example thereof may be expressed by Table 4 below.

TABLE 4

| DPA-AssistanceInfo-r12 ::= | SEQUENCE { |
|---|---|
| pbch_ra | PBCH_RA, |
| pbch_rb | PBCH_RB, |
| pss_ra | PSS_RA, |
| sss_ra | SSS_RA, |
| pcfich_rb | PDFICH_RB, |
| pdcch_ra | PDCCH_RA, |
| pdcch_rb | PDCCH_RB, |
| pdsch_ra | PDSCH_RA, |
| pdsch_rb | PDSCH_RB |
| } | |

Alternatively, the value of the transmission power information (i.e., xCH-RA and xCH-RB) may be expressed as a value of p-a and p-b (e.g., neighCellxch_P-a, neighCellxch_P-b) of each channel on the RRC signal. An example thereof may be expressed by Table 5 below.

TABLE 5

| DPA-AssistanceInfo-r12 ::= | SEQUENCE { |
|---|---|
| neighCellPbch_P-b | INTEGER (0..z) |
| neighCellPbch_P-a | ENUMERATED {dB-y1, dB-y2, ...,dB-yn} |
| neighCellPss_P-a | ENUMERATED {dB-y1, dB-y2, ..., dB-yn} |
| neighCellSss_P-a | ENUMERATED {dB-y1, dB-y2, ..., dB-yn} |
| neighCellPcfich_P-b | ENUMERATED {dB-y1, dB-y2, ..., dB-yn} |
| neighCellPdcch_P-a | ENUMERATED {dB-y1, dB-y2, ..., dB-yn} |
| neighCellPdcch_P-b | INTEGER (0..z) |
| neighCellPdsch_P-a | ENUMERATED {dB-y1, dB-y2, ..., dB-yn} |
| neighCellPdsch_P-b | INTEGER (0..z) |
| } | |

The embodiments illustrated above may be implemented by various instruments. For example, the embodiments of the present invention may be implemented by hardware, firmware, software, or combinations thereof, which will be described in detail with reference to FIG. 13.

Figure 20:
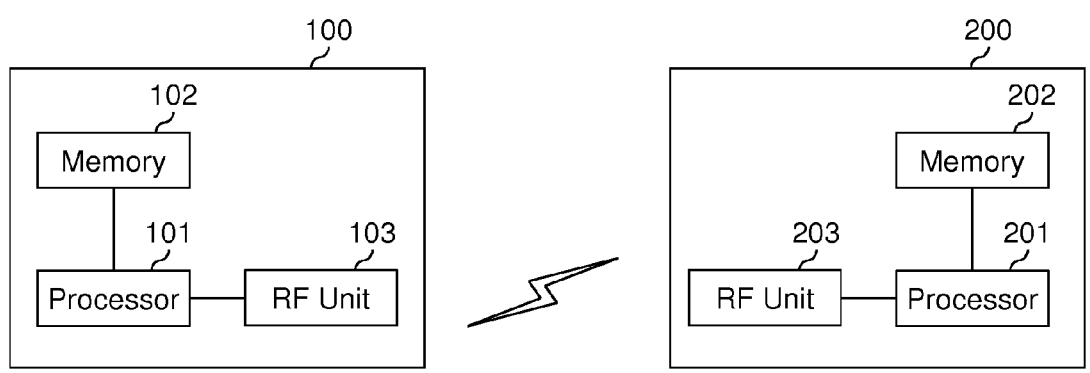
FIG. 20 is a block diagram illustrating a wireless communication system according to an embodiment of the present invention.

FIG. 20 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for interference-cancelled reception, the method performed by a User Equipment (UE) and comprising:
    receiving, from a serving cell, via a radio resource control (RRC) signal, interference cancellation assistance information including transmission power information on a channel used by a neighbor cell,
    wherein the transmission power information includes first power information and second power information, the first power information is a first Energy Per Resource Element (EPRE) ratio of the channel-to-Reference Signal (RS) in all transmitted Orthogonal Frequency Division Multiplexing (OFDM) symbols not containing the RS, and the second power information is a second EPRE ratio of the channel-to-RS in all transmitted OFDM symbols containing the RS;
    estimating a channel of the serving cell;
    receiving data by decoding the channel of the serving cell;
    regenerating data in the channel used by the neighbor cell using the first power information and the second power information; and
    cancelling interference included in the received data which is caused by the channel used by the neighbor cell by using the regenerated data.

2. The method of claim 1, wherein the transmission power information is acquired by the serving cell from the neighbor cell.

3. The method of claim 1, wherein in estimating the channel, the channel used by the neighbor cell is also estimated.

4. The method of claim 1, wherein the transmission power information regarding the channel includes a parameter which is specific to a terminal in the neighbor cell and a parameter which is specific to the neighbor cell.

5. A User Equipment (UE) for interference-cancelled reception, the UE comprising:

a radio frequency (RF) unit; and a processor, for controlling the RF unit, that:

controls the RF unit to receive, from a serving cell, via a radio resource control (RRC) signal, interference cancellation assistance information including transmission power information on a channel used by a neighbor cell, wherein the transmission power information includes first power information and second power information, the first power information is a first Energy Per Resource Element (EPRE) ratio of the channel-to-Reference Signal (RS) in all transmitted Orthogonal Frequency Division Multiplexing (OFDM) symbols not containing the RS, and the second power information is a second EPRE ratio of the channel-to-RS in all transmitted OFDM symbols containing the RS;

estimates a channel of the serving cell and thereafter controls the RF unit to receive data by decoding the channel of the serving cell;

regenerates data in the channel used by the neighbor cell using the first power information and the second power information; and cancels interference included in the received data which is caused by the channel used by the neighbor cell by using the regenerated data.

6. The terminal of claim 5, wherein the transmission power information is acquired by the serving cell from the neighbor cell.

7. The terminal of claim 5, wherein when the processor estimates the channel, the channel used by the neighbor cell is also estimated.

8. The terminal of claim 5, wherein the transmission power information regarding the channel includes a parameter which is specific to a terminal in the neighbor cell and a parameter which is specific to the neighbor cell.

* * * * *